United States Patent
Bates et al.

(10) Patent No.: US 8,388,442 B2
(45) Date of Patent: Mar. 5, 2013

(54) PREVENTION OF A USER MIMICKING ANOTHER USER IN A VIRTUAL WORLD

(75) Inventors: Cary Bates, Rochester, MN (US); Andres Gonzalez, Jr., Chicago, IL (US); Bryan Logan, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1049 days.

(21) Appl. No.: 12/204,299

(22) Filed: Sep. 4, 2008

(65) Prior Publication Data

US 2010/0057715 A1    Mar. 4, 2010

(51) Int. Cl.
- *A63F 9/24* (2006.01)
- *A63F 13/00* (2006.01)
- *G06F 17/00* (2006.01)
- *G06F 19/00* (2011.01)
- *G06F 3/048* (2006.01)

(52) U.S. Cl. ............... 463/31; 463/42; 715/706
(58) Field of Classification Search ......... 463/31, 463/42; 715/706
See application file for complete search history.

(56) References Cited

U.S. PATENT DOCUMENTS

| | | | |
|---|---|---|---|
| 6,554,706 B2 * | 4/2003 | Kim et al. | 463/36 |
| 2001/0021920 A1 * | 9/2001 | Ikeda | 705/26 |
| 2002/0082071 A1 * | 6/2002 | Riendeau et al. | 463/16 |
| 2003/0007464 A1 * | 1/2003 | Balani | 370/310 |
| 2003/0050118 A1 * | 3/2003 | Suzuki et al. | 463/42 |
| 2003/0144055 A1 * | 7/2003 | Guo et al. | 463/35 |
| 2004/0138900 A1 * | 7/2004 | Read | 705/1 |
| 2005/0020336 A1 * | 1/2005 | Cesare | 463/9 |
| 2005/0266925 A1 * | 12/2005 | Hornell et al. | 463/42 |
| 2006/0068917 A1 * | 3/2006 | Snoddy et al. | 463/42 |
| 2006/0293103 A1 * | 12/2006 | Mendelsohn | 463/42 |
| 2008/0026838 A1 * | 1/2008 | Dunstan et al. | 463/30 |

FOREIGN PATENT DOCUMENTS

GB    0805206.0    *    3/2008

* cited by examiner

*Primary Examiner* — Peter DungBa Vo
*Assistant Examiner* — Wei Li
(74) *Attorney, Agent, or Firm* — Patterson & Sheridan LLP

(57) ABSTRACT

Methods and apparatus associate a computed difference factor to avatars that are to interact with one another in a simulated environment. Applying a difference factor to the avatars enables identification of similar avatars in order to avoid mistaken identities among the avatars. The difference factor predicts probability that one avatar is mimicking another avatar. An attribute uniqueness algorithm may assign the difference factor based on name, appearance, and/or accessory similarity between two avatars. A user index may be used to store data describing attributes of each avatar for analysis using programs that are stored in memory and that execute the attribute uniqueness algorithm. Further, system validation of each avatar provides ability to protect and control likeness of the avatars in the virtual world.

19 Claims, 6 Drawing Sheets

JOHN   JON

USER INPUT   →SKEW→   ACTUAL AVATAR ELVIS

HEAD SHAPE (HSH)
1 = TALL/SKINNY
2 = ROUND
3 = OBLONG
4 = FLAT

HEAD SIZE (HSZ)
0 = SMALL
↓
50 = MEDIUM
↓
100 = LARGE

<u>AVATAR A:</u> HSH = 3; HSV = 40

<u>QUERY TO FIND AVATAR B:</u>
　　　HSH = 3 WITH 20 < HSV < 60
　　　　　　OR
　　　HSH = 2 WITH 30 < HSV < 50
　　　　　　OR
　　　OTHER SIMILAR/SAME ATTRIBUTE

<u>DIFFERENCE FACTOR:</u>

HSH 3 FOR BOTH ⟹ $|HSZ_{AVATAR\ A} - HSZ_{AVATAR\ B}|$

HSH 2 FOR AVATAR B ⟹ $2 * |HSZ_{AVATAR\ A} - HSZ_{AVATAR\ B}|$

HSH 1 OR 4 FOR AVATAR B ⟹ 10

<u>THRESHOLD FOR DIFFERENCE FACTOR:</u>　　10

FIG. 7

PREVENTION OF A USER MIMICKING ANOTHER USER IN A VIRTUAL WORLD

BACKGROUND OF THE INVENTION

1. Field of the Invention

Embodiments of the invention relate to evaluating the actions of an avatar within an immersive virtual environment.

2. Description of the Related Art

A virtual world is a simulated environment in which users may inhabit and interact with one another via avatars. Users may also interact with virtual objects and locations of the virtual world. An avatar generally provides a graphical representation of an individual within the virtual world environment. Avatars are usually presented to other users as two or three-dimensional graphical representations that resemble a human individual. Frequently, virtual worlds allow multiple users to enter the virtual environment and interact with one another. Virtual worlds are said to provide an immersive environment, as they typically appear similar to the real world and objects tend to follow rules related to gravity, topography, locomotion, physics and kinematics. Of course, virtual worlds can suspend or alter these rules as well as provide other imaginative or fanciful environments. Users typically communicate with one another through their avatars using, for example, text messages sent between avatars, real-time voice communication, gestures displayed by avatars, and symbols visible in the virtual world.

Virtual worlds may be persistent. A persistent world provides an immersive environment (e.g., a fantasy setting used as a setting for a role-playing game, or a virtual world complete with land, buildings, towns, and economies) that is generally always available, and world events happen continually, regardless of the presence of a given avatar. Thus, unlike more conventional online games or multi-user environments, the virtual world continues to exist, and plot and events continue to occur as users enter (and exit) the virtual world.

Virtual worlds may provide an opportunity for users to create an avatar that looks exactly like another avatar. Such spoofing in the virtual world can cause problems for the user being spoofed. Further, this ability to mimic other avatars can provide, without justification, leverage to use social engineering to obtain confidential information.

SUMMARY OF THE INVENTION

In one embodiment, a method of monitoring for avatar mimicking includes providing a system linked to a network that enables communication between first and second avatars. The method further includes receiving in the system user input of first attributes for the first avatar and comparing the first attributes for the first avatar with second attributes for the second avatar to generate a difference factor indicative of how similar the first and second attributes are to one another. Denying acceptance of the first attributes occurs when the difference factor fails to reach a threshold set to ensure uniqueness of the second avatar relative to the first avatar.

For one embodiment, a computer readable medium contains a program which, when executed, performs an operation to monitor for avatar mimicking that includes assigning attribute values to a new avatar upon the new avatar creating an account on a system linked to a network that enables communication with other avatars. Comparing the attribute values of the new avatar to corresponding values associated with an existing avatar generates a difference factor. Denying acceptance of the account for the new avatar occurs when the difference factor fails to reach a threshold set to ensure uniqueness of the existing avatar relative to the new avatar.

According to one embodiment, a method of monitoring for avatar mimicking includes assigning attribute values to a new avatar upon the new avatar creating an account on a system linked to a network that enables communication with other avatars. Comparing the attribute values of the new avatar to corresponding values associated with an existing avatar generates a difference factor. Limiting acceptance of the account for the new avatar occurs based on the difference factor reaching a threshold set based on acceptable similarity between the existing avatar and the new avatar.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 7 is a diagram illustrating an attribute similarity assessment process, according to one embodiment of the invention.

DETAILED DESCRIPTION OF THE PREFERRED EMBODIMENTS

Figure 1:
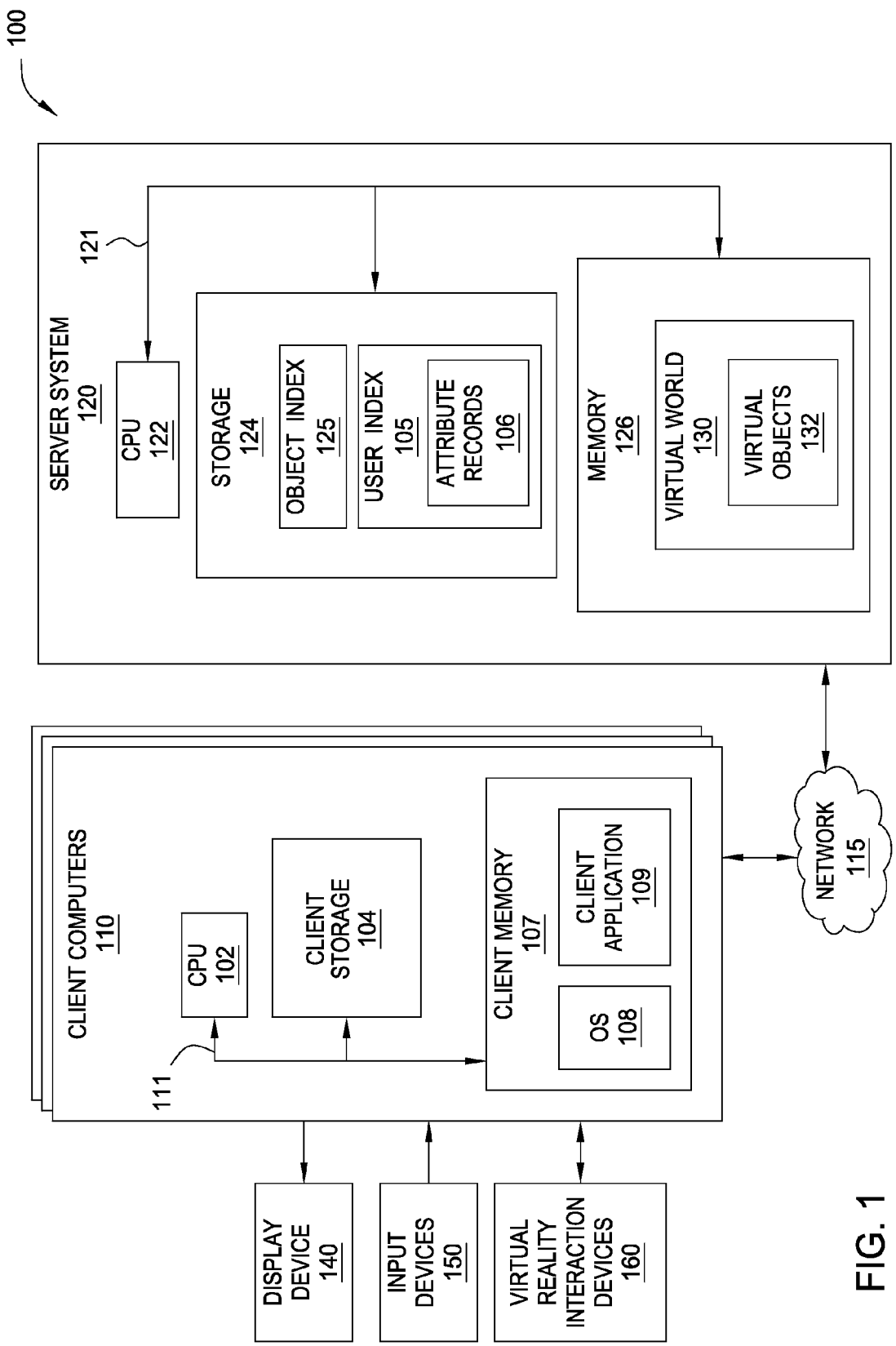
FIG. 1 is a block diagram that illustrates a client server view of a computing environment configured for displaying avatars and monitoring the avatars in a virtual world, according to one embodiment of the invention.

Virtual worlds typically provide a simulated environment in which users may inhabit and interact with one another via avatars. In real life, people can differentiate one another based on actual attributes that often cannot be readily transformed or otherwise disguised even if desired to imitate someone else. As stated, however, a virtual environment may allow users to duplicate, sometimes in exact detail, the appearance of others.

To address this issue, embodiments of the invention may apply a difference factor to avatars in order to enable identification of similar avatars and to avoid mistaken identities among the avatars. For example, the difference factor may be used to predict whether one avatar is mimicking another. In one embodiment, an attribute uniqueness algorithm may assign the difference factor based on name, appearance, and/ or accessory similarity between two avatars. In practice, a user index may be used to store data describing attributes of each avatar for analysis using programs that are stored in memory and that execute the attribute uniqueness algorithm. Further, system validation of each avatar provides ability to protect and control likeness of the avatars in the virtual world.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 shows a block diagram that illustrates a client server view of computing environment 100, for one embodiment. As shown, the computing environment 100 includes client computers 110, network 115 and server system 120. In one embodiment, the computer systems illustrated in FIG. 1 are included to be representative of existing computer systems, e.g., desktop computers, server computers, laptop computers, and tablet computers. The computing environment 100 illustrated in FIG. 1, however, is merely an example of one computing environment. Embodiments of the invention may be implemented using other environments, regardless of whether the computer systems are complex multi-user computing systems, such as a cluster of individual computers connected by a high-speed network, single-user workstations, or network appliances lacking non-volatile storage. Further, the software applications illustrated in FIG. 1 and described herein may be implemented using computer software applications executing on existing computer systems, e.g., desktop computers, server computers, laptop computers, and tablet computers. However, the software applications described herein are not limited to any currently existing computing environment or programming language, and may be adapted to take advantage of new computing systems as they become available.

In one embodiment, the server system 120 includes a central processing unit (CPU) 122, which obtains instructions and data via a bus 121 from memory 126 and storage 124. The processor 122 could be any processor adapted to support the methods of the invention. The memory 126 is any memory sufficiently large to hold the necessary programs and data structures. The memory 126 can be one or a combination of memory devices, including Random Access Memory, non-volatile or backup memory, (e.g., programmable or Flash memories, read-only memories, etc.). In addition, the memory 126 and storage 124 may be considered to include memory physically located elsewhere in the server system 120, for example, on another computer coupled to the server system 120 via the bus 121. The server system 120 may be operably connected to the network 115, which generally represents any kind of data communications network. Accordingly, the network 115 may represent both local and wide area networks, including the Internet.

As shown, the memory 126 includes virtual world 130. In one embodiment, the virtual world 130 may be a software application that accepts connections from multiple clients, allowing users to explore and interact with an immersive virtual environment by controlling the actions of an avatar. Illustratively, the virtual world 130 includes virtual objects 132. The virtual objects 132 represent the content present within the environment provided by the virtual world 130, including both elements of the "world" itself as well as elements controlled by a given user. Illustratively, the storage 124 includes an object index 125, a user index 105, and attribute records 106. For example, the object index 125 may store data describing characteristics of the virtual objects 132 included in the virtual world 130, and may be accessed to perform searches of the virtual objects 132. In one embodiment, the user index 105 stores records related to the avatars, such as data regarding similarity of the avatars as determined based on the attribute records 106, which include data describing the avatars.

As shown, each client computer 110 includes a CPU 102, which obtains instructions and data via a bus 111 from client memory 107 and client storage 104. The CPU 102 is a programmable logic device that performs all the instruction, logic, and mathematical processing in a computer. The client storage 104 stores application programs and data for use by the client computer 110. The client storage 104 includes, for example, hard-disk drives, flash memory devices, and optical media. The client computer 110 is operably connected to the network 115.

The client memory 107 includes an operating system (OS) 108 and a client application 109. The operating system 108 is the software used for managing the operation of the client computer 110. Examples of the OS 108 include UNIX, a version of the Microsoft Windows® operating system, and distributions of the Linux® operating system. (Note, Linux is a trademark of Linus Torvalds in the United States and other countries.)

In one embodiment, the client application 109 provides a software program that allows a user to connect to the virtual world 130, and once connected, to explore and interact with the virtual world 130. Further, the client application 109 may be configured to generate and display a visual representation, generally referred to as the avatar, of the user within the immersive environment. The avatar of the user is generally visible to other users in the virtual world, and the user may view avatars representing the other users. The client application 109 may also be configured to generate and display the immersive environment to the user and to transmit the user's desired actions to the virtual world 130 on the server 120. Such a display may include content from the virtual world determined from the user's line of sight at any given time. For the user, the display may include the avatar of that user or may be a camera eye where the user sees the virtual world through the eyes of the avatar representing this user.

Figure 2:
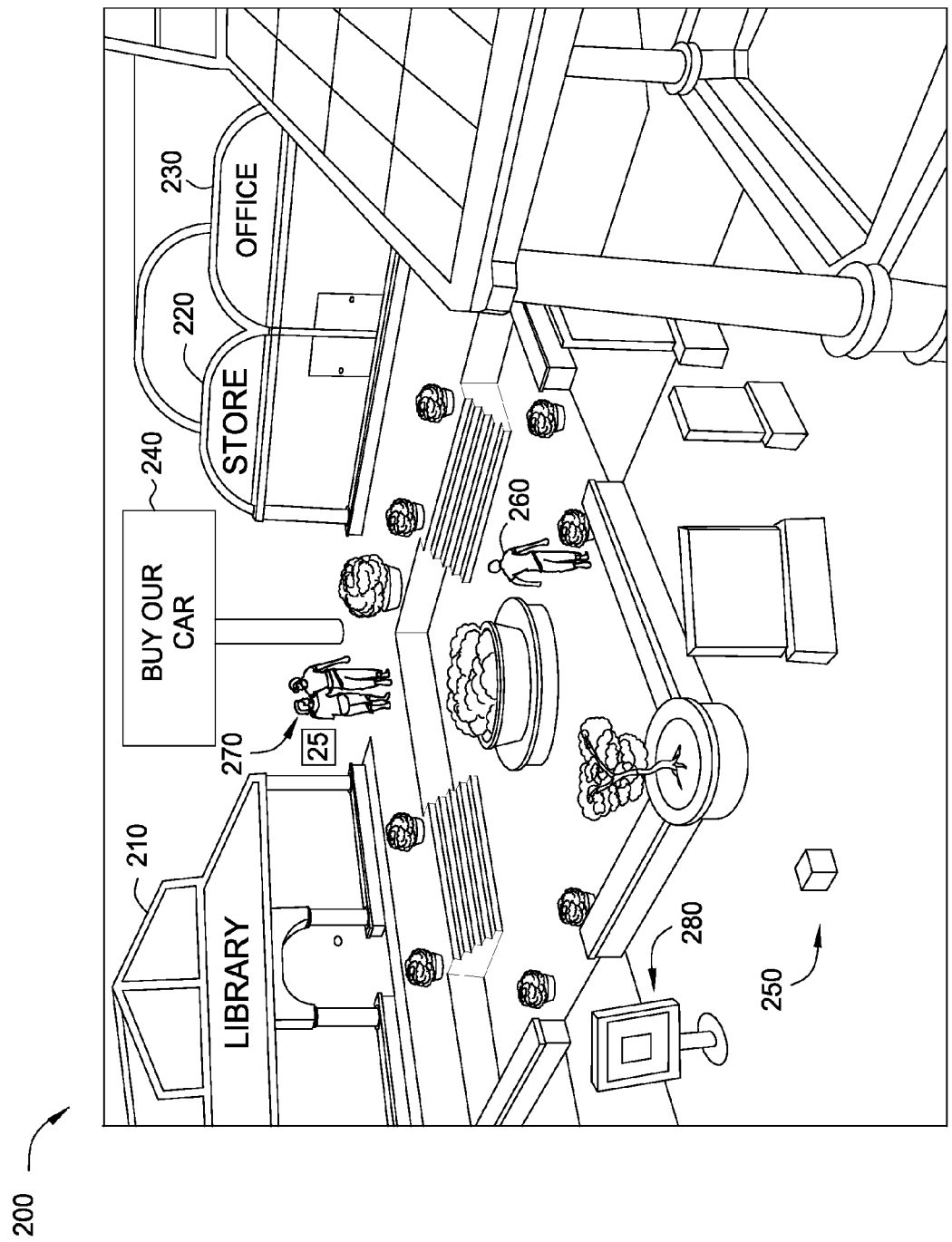
FIG. 2 illustrates an example display of a user participating via one of the avatars in the virtual world, according to one embodiment of the invention.

For instance, using the example illustrated in FIG. 2, the virtual objects 132 may include a box 250, a store 220, and a library 210. More specifically, FIG. 2 illustrates a user display 200 for a user participating in a virtual world, according to one embodiment. In this example, the user is represented by a user avatar 260, and other users are represented by a third party avatar 270. Within the virtual world 130, avatars can interact with other avatars. For example, the user with the user avatar 260 can click on the third party avatar 270 to start an instant message conversation with the other user associated with the third party avatar 270. The user may interact with elements displayed in the user display 200. For example, the user may interact with the box 250 by picking it up and opening it. The user may also interact with a kiosk 280 by operating controls built into the kiosk 280 and requesting information. The user may also interact with a billboard 240 by looking at it (i.e., by positioning the line of sight directly towards the billboard 240). Additionally, the user may interact with larger elements of the virtual world. For example, the user may be able to enter the store 220, the office 230, or the library 210.

The user may view the virtual world using a display device 140, such as an LCD or CRT monitor display, and interact with the client application 109 using input devices 150 (e.g., a keyboard and a mouse). Further, in one embodiment, the user may interact with the client application 109 and the virtual world 130 using a variety of virtual reality interaction devices 160. For example, the user may don a set of virtual reality goggles that have a screen display for each lens. Further, the goggles can be equipped with motion sensors that cause the view of the virtual world presented to the user to move based on the head movements of the individual. As another example, the user can don a pair of gloves configured to translate motion and movement of the user's hands into avatar movements within the virtual reality environment. Of course, embodiments of the invention are not limited to these examples and one of ordinary skill in the art will readily recognize that the invention may be adapted for use with a variety of devices configured to present the virtual world to the user and to translate movement/motion or other actions of the user into actions performed by the avatar representing that user within the virtual world 130.

Figure 3:
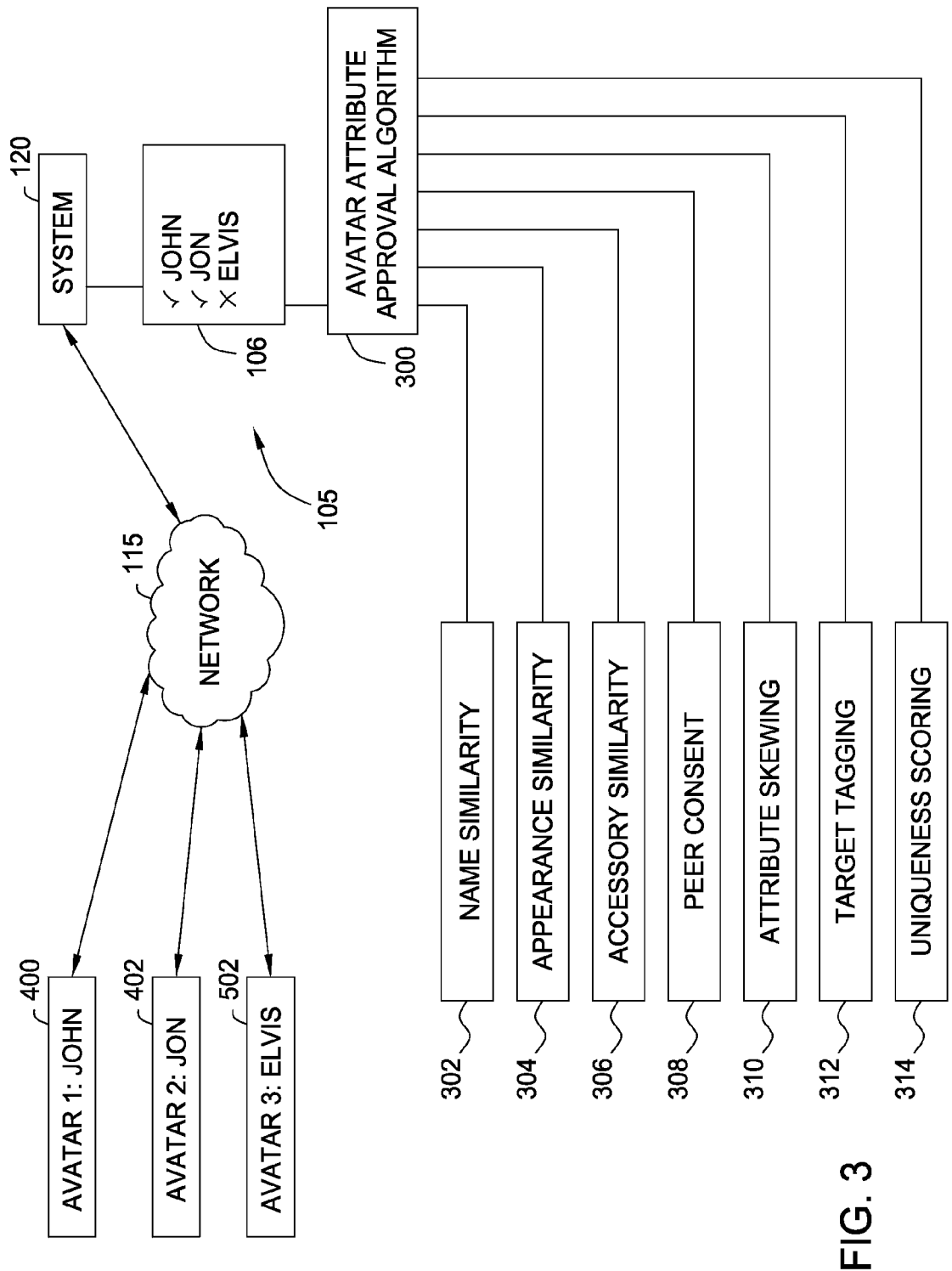
FIG. 3 is a schematic diagram showing multiple avatars validated by an avatar attribute approval algorithm of a server system, according to one embodiment of the invention.

FIG. 3 illustrates a schematic application of avatar attribute validation, according to one embodiment of the invention. As previously mentioned, validating avatar attributes may ensure sufficient dissimilarity in likeness between multiple avatars. For example, avatar attribute validation may be used to ensure that the appearance of a first avatar 400 (see, FIG. 4), a second avatar 402 (see, FIG. 4), and a third avatar 502 (see, FIG. 5) are sufficiently distinct so as to effectively prevent one user from creating an avatar that mimics the appearance of another. In operation, the system 120 may store account information for the avatars 400, 402, 502 in the user index 105 once each user opens an account corresponding to a respective one of the avatars 400, 402, 502. An avatar attribute approval algorithm 300 executed by the system 120 takes data describing the avatars 400, 402, 502 from the attribute records 106 correlated within the user index 105 and computes similarity comparisons and/or skews attributes of any of the avatars 400, 402, 502. Various exemplary criteria used by the avatar attribute approval algorithm 300 and explained further herein include name similarity 302, appearance similarity 304, accessory similarity 306, and peer consent 308. The avatar attribute approval algorithm 300 may use one of these criteria alone or any combination of these criteria. In some embodiments, the avatar attribute approval algorithm 300 performs one or more of attribute skewing 310, target tagging 312, and uniqueness scoring 314, as also explained further herein.

Figure 4:
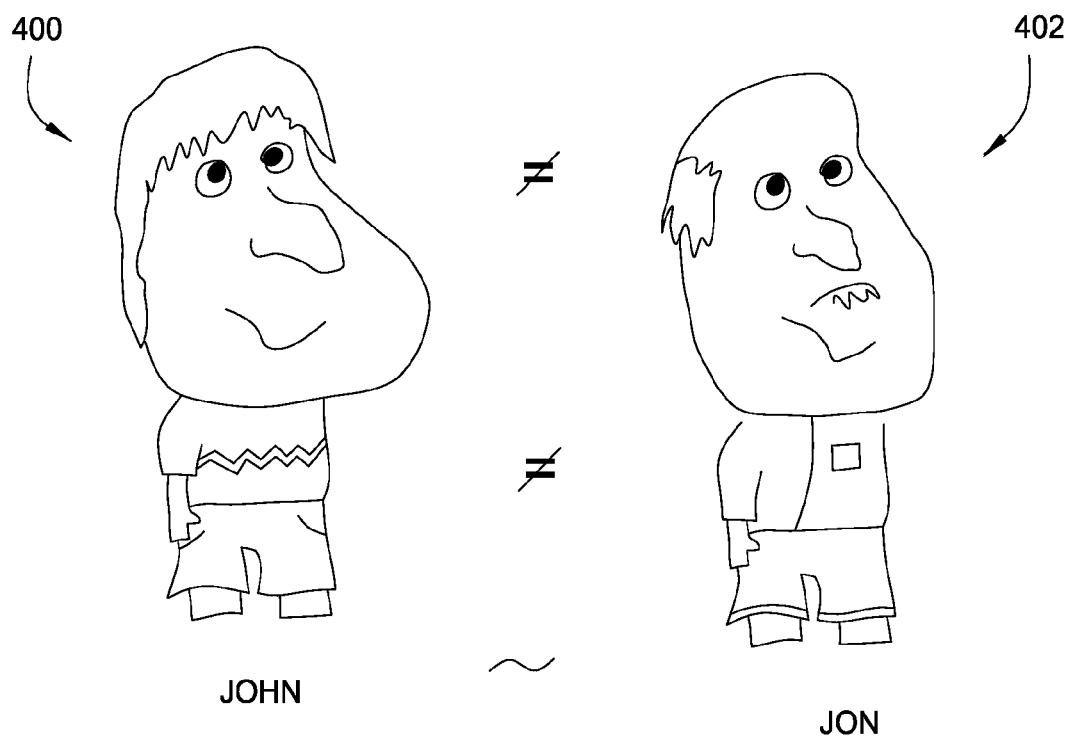
FIG. 4 illustrates two avatars with some similar attributes but with enough dissimilar attributes to enable distinction as determined via a validation check, according to one embodiment of the invention.

FIG. 4 illustrates an example of a first avatar 400 and a second avatar 402, which, as denoted by comparison symbols and with reference to FIG. 3, are analyzed by the system 120 with respect to the name, appearance, and accessory similarities 302, 304, 306. For example, the first avatar 400 represents an established user such that the second avatar 402 is compared to the first avatar 400. Upon making this comparison via computation of the difference factor, the second avatar 402 may be denied an account if the second avatar 402 is too similar to the first avatar 400 as determined by the difference factor failing to reach a threshold. For some embodiments, multiple difference factors and corresponding thresholds enable separate and/or linked analysis of sets of attributes, such as the name, appearance and accessory similarities 302, 304, 306. As used herein, the difference factor may refer to any one of the multiple difference factors if more than one is present.

By way of example since correlations may be reversed and relative values are provided for explanation purposes only, increases in the difference factor correspond to less similarity and less likelihood of being mistaken for another avatar. The threshold in this example represents a minimum value for the difference factor needed to establish acceptable distinctions between the first and second avatars 400, 402. No adjustment occurs to the difference factor for attributes that are equal for both the first and second avatars 400, 402. Adjustment values may be assigned proportional to an amount of distinction between individual attributes of the first and second avatars 400, 402 and to the difference factor when the individual attributes are not alike for both the first and second avatars 400, 402. The adjustment values add relatively less to the difference factor the more similar the individual attributes are between the first and second avatars 400, 402. Relationships between individual attributes may also be compared. For example, all the individual attributes of the first avatar 400 being proportional in size to the individual attributes of the second avatar 402 demonstrates close similarity and hence a relatively smaller value than if not all individual attribute size ratios are in proportion.

With respect to the name similarity 302, determinations of the first and second avatars 400, 402 having similar names may provide recognition of potentially similar avatars. The name of the first avatar 400 being John and the name of the second avatar 402 being Jon makes the first and second avatars 400, 402 have such similar names since only a single letter omission differentiates the names that are the same phonetically. Misspellings or alternate spellings, nicknames, phonetic matches, and character replacement, such as substituting "1" for "I," represent possible alterations that may be made to a name while still being identified as similar to that name. Searches and correlations may return all avatar names that are similar to one another with adjustment values for the difference factor applied according to how different the names are from one another. For example, the adjustment value for the difference factor may be zero when comparing avatars with name matches, one when comparing avatars identified as having similar names, and five when comparing all other avatars.

In some embodiments, the similar names identify the first avatar 400 as a potential target for spoofing such that other attributes between the first and second avatars 400, 402 must be more dissimilar than with avatars having dissimilar names. By way of example, the first and second avatars 400, 402 must possess more different attributes with respect to, for example, appearance and accessory similarities 304, 306 than if the name of the second avatar 402 is unrelated at all to John. As further examples, attempts by the second avatar 402 to take the name John instead of Jon or use a last name in common with the first avatar 400 (e.g., John Doe and Jon Doe) may result in rejection of the second avatar 402 from being able to establish an account regardless of other attributes since the difference factor may not reach the threshold based on name alone. As shown in FIGS. 3 and 4, the first and second avatars 400, 402 possess enough dissimilar attributes with respect to appearance and accessory similarities 304, 306 to enable distinction. Accounts for the first and second avatars 400, 402 hence remain active in the user index 105 as denoted by checked markings in FIG. 3 since the difference factor meets the threshold even though the first and second avatars 400, 402 have the similar names.

The appearance similarity 304 may include comparison of attributes such as gender, height, head shape, head size, hair color, baldness, nose shape, nose size, eye shape, eye size, skin color, facial hair, mouth shape, mouth size and lip size. For the shape of the attributes, a table may indicate similarity of the shapes and assign the adjustment value for the difference factor. For example, the nose shape may represent thin, average and wide shapes or corresponding numbers representing each shape. The similarity between the thin shape and the average shape is greater than the similarity between the thin shape and the wide shape. The adjustment value hence is greater for comparison of two avatars when the avatars have the thin shape and the wide shape than when the two avatars have the thin shape and the average shape.

As shown, the first avatar 400 shares some common appearance attributes with the second avatar 402 such that a query for avatars potentially similar to the second avatar 402 may select the first avatar 400 for comparison to determine if the second avatar 402 is different enough from the first avatar 400. The user of the second avatar 402 desires to have attributes including height, head size, eye shape, eye size and nose shape in common with the first avatar 400 while having attributes including face shape, facial hair and nose size differ from the first avatar 400. An exemplary query (see, FIG. 7) to identify the first avatar 400 as being potentially similar may select other avatars based on combinations and various range values corresponding to the attributes of the second avatar 402 entered into a query with appropriate operators separating the combinations to limit results upon execution of the query.

Some adjustment values associated with only one attribute may enable the difference factor to achieve the threshold if a difference between the first avatar 400 and the second avatar 402 due to the one attribute alone is sufficient to make the second avatar 402 unique. For example, the adjustment value representative of the first avatar 400 having hair and the second avatar 402 being bald may make the difference factor reach the threshold even though other attributes are alike. Due to the nose shape for the second avatar 402 being the same shape as the nose shape of the first avatar 400, the query may select the first avatar 400 for comparison to the second avatar 402 since to be considered similar the nose size may vary more if the nose shapes are alike than if the nose shapes differ. Further, increases in the adjustment value for the difference factor due to the nose size may be less than if the nose shapes differ. If the nose size provides the only difference between the first avatar 400 and the second avatar 402, the difference factor fails to reach the threshold indicating that the first and second avatars 400, 402 are too similar.

Regarding the accessory similarity 306, the first avatar 400 wears a short sleeve t-shirt with a pattern and pants with pockets and no cuffs while the second avatar 402 wears a button-down long sleeve shirt with a pocket and pants with a cuff. These exemplary clothing styles represent one option for use in analyzing the accessory similarity 306, which is evaluated as discussed herein. Other accessory related attributes may include jewelry, baggage, pets or personal equipment. As used herein, the accessory similarity 306 further defines the avatar appearance. Similar to the name similarity 302, the first avatar 400 being in more casual wear than formal attire of the second avatar 402 may enable the second avatar 402 to have the appearance similarity 304 be closer in matching the first avatar 400. Also, attempts by the second avatar 402 to dress in common with the first avatar 400 may result in the second avatar 402 being rejected from establishing an account regardless of other attributes, since the difference factor may simply not reach the threshold based on the accessory similarity 306 alone. For some embodiments, restrictions limit outfits that the first and second avatars 400, 402 may change into if the outfits tend to cause others to confuse the first and second avatars 400, 402 with one another. The restrictions may depend on the appearance similarity 304 and be dictated by the difference factor. Difference in the accessory similarity 306 and/or the name similarity 302 may fail to cause the difference factor to reach the threshold without at least some distinction identified in the appearance similarity 304.

With respect to the peer consent 308, the system 120 allows the user of the first avatar 400 to approve or disapprove use of the second avatar 402, in some embodiments. The peer consent 308 may occur when the difference factor reaches the threshold for a minimum acceptable difference between the first and second avatars 400, 402 but fails to reach a criteria indicating dissimilarity between the first and second avatars 400, 402. The first avatar 400 may set values for the criteria indicating dissimilarity between the first avatar 400 and any other avatars. Upon the system 120 thereby deeming the first and second avatars 400, 402 similar, the peer consent 308 functions to enable the user of the first avatar 400 to control likeness of the first avatar 400 and know who else looks like the first avatar 400.

Figure 5:
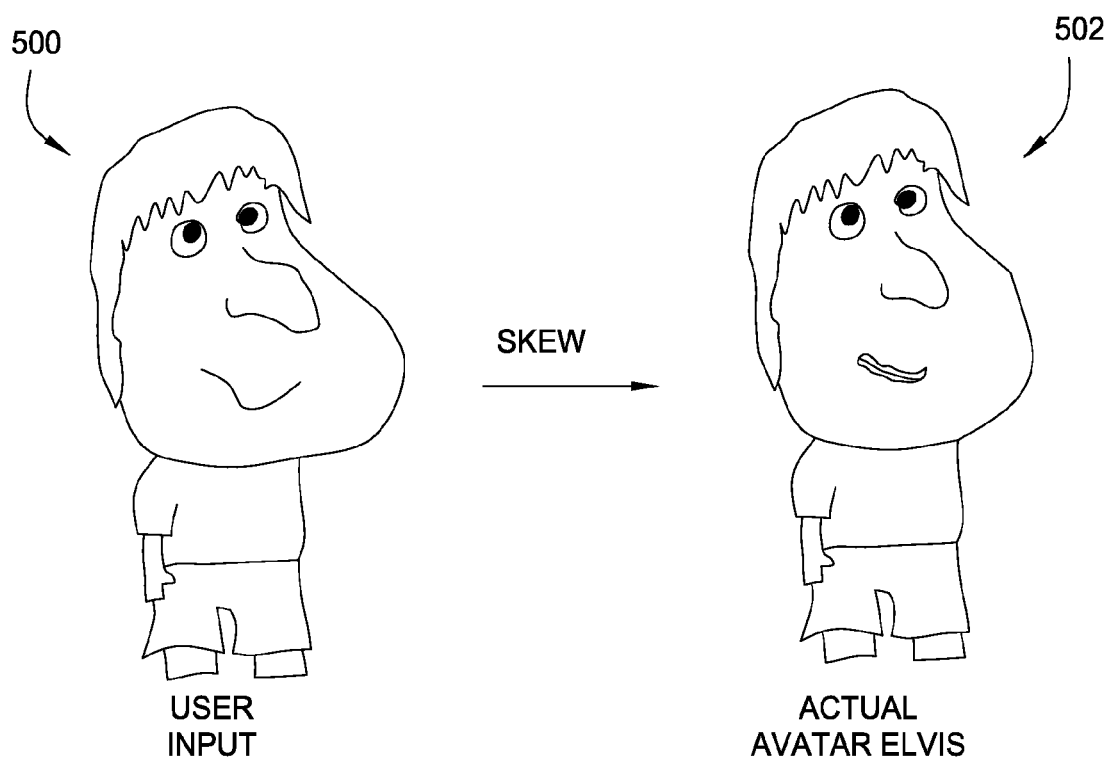
FIG. 5 illustrates an avatar before and after having attributes skewed, according to one embodiment of the invention.

FIG. 5 illustrates the attribute skewing 310 that occurs for some embodiments. A user creates a desired avatar 500 for input into the system 120. The system 120 then skews various values for attributes of the desired avatar 500 to generate an actual avatar 502. This skewing generates a randomized look in an approach that like the real world takes some appearance control from the user. The attributes of the actual avatar 502 that are shown skewed include face shape, nose shape, nose size, mouth size and lip size. Skewing of the values may occur at random for all avatars or be done to avoid overlap with the first avatar 400, for example. The skewing thereby prevents spoofing of the first avatar 400 using the desired avatar 500 since it is the actual avatar 502 that is accepted by the system 120.

Regarding the target tagging 312, tagging of certain avatars as potential targets for spoofing may also raise the threshold required for the difference factor. The actual avatar 502 who is named Elvis may be a celebrity making the probability higher that someone would spoof the actual avatar 502. Other exemplary targets for spoofing include avatars with authority or power. By way of example, absence of any indication that the actual avatar 502 is targeted results in the adjustment value being a number that changes the difference factor toward the threshold when comparing another avatar to the actual avatar 502, whereas the number for the adjustment value decreases with celebrity level of the actual avatar 502.

With regards to the uniqueness scoring 314, the system 120 may output to users data displayed as a score representative of the difference factor between two avatars, such as a particular avatar and another avatar in the system 120 that is most similar to the particular avatar. For example, the user of the second avatar 402 may obtain the score when selecting clothing so as to know how unique the second avatar 402 is relative to the first avatar 400 if the second avatar 402 chooses a particular outfit. Upon creating the actual avatar 502, the score may output to the user for the actual avatar 502 to provide a quantitative warning that the actual avatar 502 has similarity to the first and/or second avatars 400, 402. As a further example, the user of the second avatar 402 may access the score of the first avatar 400 to see how similar other avatars in the system 120 appear to the first avatar 400.

Figure 6:
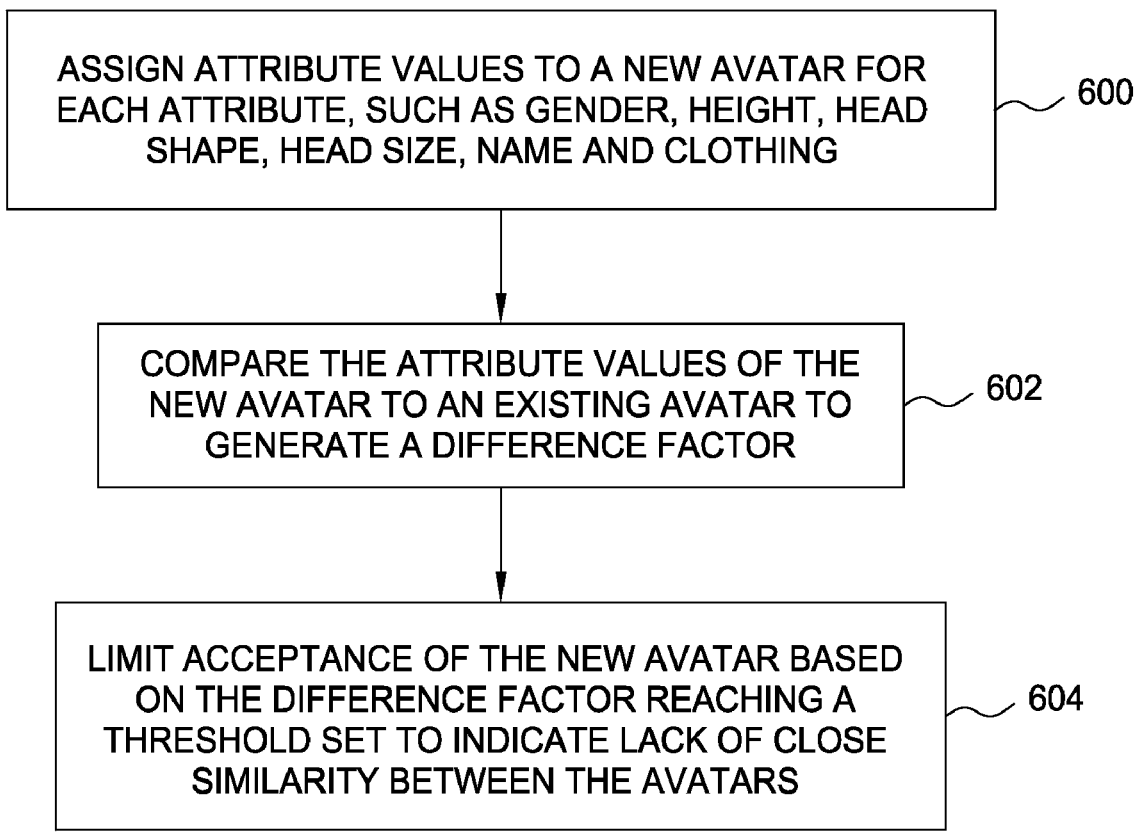
FIG. 6 is a flow diagram illustrating a method of monitoring for avatar mimicking, according to one embodiment of the invention.

FIG. 6 is a flow diagram illustrating a method of monitoring for avatar mimicking. At initiation step 600, assigning attribute values to a new avatar occurs upon the new avatar creating an account on a system linked to a network that enables communication with other avatars. The attribute values correspond to respective attributes such as gender, height, head shape, head size, name and clothing. Evaluation step 602 includes comparing the attribute values of the new avatar to those of an existing avatar to generate a difference factor. Limiting acceptance of the new avatar occurs based on the difference factor reaching a threshold set to indicate lack of close similarity between the avatars, at conditional step 604. If the new avatar is not mimicking another avatar, the computed difference factor should reach the threshold in conditional step 604 such that the account is accepted.

FIG. 7 is a diagram illustrating an attribute similarity assessment process exemplifying aspects of the approval algorithm 300 as discussed herein. The process compares attributes of avatar A to avatar B in order to approve or disapprove acceptance of the avatar B. For simplicity, this comparison includes only two attributes, which are head shape and head size. Possibilities for the head shapes include tall/skinny, round, oblong and flat. The head sizes range from zero being small to one hundred being large with a median of fifty being medium. The avatar A has the head shape that is oblong and the head size of forty.

A query searches for all avatars similar to the avatar A in order to find the avatar B. The query selects avatars (i) having an oblong head shape like avatar A and the head size within a range of twenty to sixty, (ii) having a round head shape and the head size within a range of thirty to fifty, or (iii) having some other attribute that is the same or similar to that of the avatar A.

The difference factor for illustration purposes includes the adjustment value associated with only the head size and the head shape. The difference factor accounts for likelihood of confusion. Avatars with the tall/skinny or flat head shape do not tend to be confused with those having the oblong head shape like the avatar A. If the avatar B returned by the query thus has the tall/skinny or flat head shape, the difference factor is ten, which is also the threshold for the difference factor. Upon meeting the threshold the avatar B is deemed acceptable and allowed to open and/or maintain an account for the avatar B. If the avatar B returned by the query has the oblong head shape like the avatar A, absolute value of difference between head sizes of the avatar A and the avatar B defines the difference factor. Given that the oblong and round head shapes are different but potentially confusable, two times absolute value of difference between head sizes of the avatar A and the avatar B defines the difference factor if the avatar B returned by the query has the round head shape.

Advantageously, embodiments of the invention can prevent or mitigate mimicking of avatars in the virtual world. The system validation may protect and control likeness of the avatars in the virtual world. Embodiments of the invention thus facilitate interactions in the virtual world.

For illustration purposes only, descriptions herein refer to avatars having a generally human form. However, embodiments may be adapted for use where avatars take on any appearance. For example, the avatars may include animals, creatures, real or imagined, or characters from fiction.

While the foregoing is directed to embodiments of the present invention, other and further embodiments of the invention may be devised without departing from the basic scope thereof, and the scope thereof is determined by the claims that follow.

What is claimed is:

1. A method of monitoring for avatar mimicking within a virtual environment, comprising:
   providing a virtual environment for a first avatar and a second avatar, wherein the first avatar has a first identity including a first name and a first appearance;
   receiving user input of a proposed identity for the second avatar, the proposed identity including a proposed name and a proposed appearance, wherein the proposed name is different from the first name, wherein the proposed appearance is different from the first appearance;
   determining, by operation of one or more computer processors, a similarity score based on a similarity of the first appearance and the proposed appearance, wherein the similarity of the first appearance and the proposed appearance is based on a comparison of an attribute of the first appearance and the proposed appearance, wherein the similarity score is representative of a uniqueness of the first appearance and the proposed appearance;
   outputting an indication of the similarity score for display; and
   upon determining, based on the similarity score exceeding a threshold, that the proposed identity closely resembles the first identity, denying acceptance of the proposed identity to ensure a minimum specified difference in identity of the second avatar relative to the first avatar, wherein the threshold is altered based on the first identity.

2. The method of claim 1, wherein denying acceptance of the proposed identity is further based on feedback from a user controlling the first avatar, the method further comprising:

upon receiving approval from the user controlling the first avatar, accepting the proposed identity.

3. The method of claim 2, wherein outputting the indication of the similarity score for display comprises displaying the similarity score on the display.

4. The method of claim 3, wherein the first appearance and the proposed appearance relate to accessories associated with the first and second avatars, respectively, wherein the attribute of the first appearance and the proposed appearance comprises at least one of: (i) gender, (ii) height, (iii) head shape, (iv) head size, (v) hair color, (vi) baldness, (vii) nose shape, (viii) nose size, (ix) eye shape, (x) eye size, (xi) skin color, (xii) facial hair, (xiii) mouth shape, (xiv) mouth size, and (xv) lip size.

5. The method of claim 4, further comprising programmatically skewing the proposed appearance, wherein the skewing introduces a random modification to the proposed appearance of the second avatar.

6. The method of claim 5, further comprising skewing the proposed name, wherein the skewing is applied to avoid overlap of the first identity with the proposed identity, wherein an updated similarity score computed after skewing does not exceed the threshold.

7. The method of claim 6, wherein altering the threshold comprises:

upon determining, based on a celebrity status, a politician status, or a popularity status of the first avatar, that the first identity is an increased target for mimicking, increasing the threshold; and upon determining, based on a lack a celebrity status, lack of a politician status, or lack of a popularity status of the first avatar, that the first identity is not an increased target for mimicking, decreasing the threshold.

8. The method of claim 7, further comprising querying a system containing the virtual environment to determine the identity of the first avatar, wherein the attribute of the first appearance and the proposed appearance comprises at least three of: (i) gender, (ii) height, (iii) head shape, (iv) head size, (v) hair color, (vi) baldness, (vii) nose shape, (viii) nose size, (ix) eye shape, (x) eye size, (xi) skin color, (xii) facial hair, (xiii) mouth shape, (xiv) mouth size, and (xv) lip size.

9. A non-transitory computer readable storage medium containing a program which, when executed, performs an operation to monitor for avatar mimicking within a virtual world, comprising:

providing a virtual environment for a first avatar and a second avatar, wherein the first avatar has a first identity including a first name and a first appearance;

receiving, in the system, user input of a proposed identity for the second avatar, the proposed identity including a proposed name and a proposed appearance, wherein the proposed name is different from the first name, wherein the proposed appearance is different from the first appearance;

determining a similarity score based on a similarity of the first appearance and the proposed appearance, wherein the similarity of the first appearance and the proposed appearance is based on a comparison of an attribute of the first appearance and the proposed appearance, wherein the similarity score is representative of a uniqueness of the first appearance and the proposed appearance;

outputting an indication of the similarity score for display; and upon determining, based on the similarity score exceeding a threshold, that the proposed identity closely resembles the first identity, denying acceptance of the proposed identity to ensure a minimum specified difference in identity of the second avatar relative to the first avatar, wherein the threshold is altered based on the first identity.

10. The non-transitory computer readable storage medium of claim 9, wherein outputting the indication of the similarity score for display comprises displaying the similarity score on the display.

11. The non-transitory computer readable storage medium of claim 10, wherein the operation further comprises skewing at least one of the proposed name or proposed appearance to change the proposed appearance of the second avatar.

12. The non-transitory computer readable storage medium of claim 11, wherein the operation further comprises querying a system containing the virtual environment to determine the identity of the first avatar.

13. A system, comprising:

one or more computer processors; and a memory containing a program, which, when executed by the one or more processors, is configured to perform an operation for monitoring for avatar mimicking within a virtual environment, the operation comprising the steps of:

providing a virtual environment for a first avatar and a second avatar, wherein the first avatar has a first identity including a first name and a first appearance;

receiving, in the system, user input of a proposed identity for the second avatar, the proposed identity including a proposed name and a proposed appearance, wherein the proposed name is different from the first name, wherein the proposed appearance is different from the first appearance;

determining a similarity score based on similarity of the first appearance and the proposed appearance, wherein the similarity of the first appearance and the proposed appearance is based on a comparison of an attribute of the first appearance and the proposed appearance, wherein the similarity score is representative of a uniqueness of the first appearance and the proposed appearance;

outputting an indication of the similarity score for display; and upon determining, based on the similarity score exceeding a threshold, that the proposed identity closely resembles the first identity, denying acceptance of the proposed identity to ensure a minimum specified difference in identity of the second avatar relative to the first avatar, wherein the threshold is altered based on the first identity.

14. The system of claim 13, wherein outputting the indication of the similarity score for display comprises displaying the similarity score on the display, wherein denying acceptance of the proposed identity is further based on feedback from a user controlling the first avatar, the operation further comprising:

upon receiving approval from the user controlling the first avatar, accepting the proposed identity.

15. The system of claim 14, wherein altering the threshold comprises:
    upon determining, based on a celebrity status, a politician status, or a popularity status of the first avatar, that the first identity is a target for mimicking, increasing the threshold; and
    upon determining, based on a lack a celebrity status, lack of a politician status, or lack of a popularity status of the first avatar, that the first identity is not a target from mimicking, decreasing the threshold.

16. The system of claim 15, the operation further comprising programmatically skewing the proposed appearance, wherein the skewing randomly changes the proposed appearance of the second avatar.

17. The system of claim 16, the operation further comprising skewing the proposed name, wherein the skewing is applied to avoid overlap of the first identity with the proposed identity, wherein an updated similarity score computed after skewing does not exceed the threshold.

18. The non-transitory computer readable storage medium of claim 9, wherein altering the threshold comprises:
    upon determining, based on a celebrity status, a politician status, or a popularity status of the first avatar, that the first identity is a target for mimicking, increasing the threshold; and
    upon determining, based on a lack a celebrity status, lack of a politician status, or lack of a popularity status of the first avatar, that the first identity is not a target from mimicking, decreasing the threshold.

19. The non-transitory computer readable storage medium of claim 18, wherein denying acceptance of the proposed identity is further based on feedback from a user controlling the first avatar, the operation further comprising:
    upon receiving approval from the user controlling the first avatar, accepting the proposed identity.

* * * * *